United States Patent [19]

Bonissone et al.

[11] Patent Number: 4,822,270
[45] Date of Patent: Apr. 18, 1989

[54] DEVICE FOR FORMING OF THERMOPLASTIC PRODUCTS EQUIPPED WITH UNDERCUTS

[75] Inventors: Giancarlo Bonissone; Piero Mulas, both of Genoa, Italy

[73] Assignee: F. I. P. Formatura Iniezione Polimeri S.p.A., Genoa, Italy

[21] Appl. No.: 47,199

[22] Filed: Jun. 6, 1987

[51] Int. Cl.[4] .................. B29C 39/38; B29C 39/34; B29C 41/40

[52] U.S. Cl. ......................... 425/289; 249/59; 249/78; 249/79; 249/122; 249/184; 425/547; 425/556; 425/577; 425/DIG. 13

[58] Field of Search ............... 249/59, 63, 66 R, 67, 249/68, 175, 79, 180, 176, 177, 184, 78, 122; 425/547, 541, 577, 289, 556

[56] References Cited

U.S. PATENT DOCUMENTS

| | | | |
|---|---|---|---|
| 2,306,205 | 12/1942 | Crosman | 249/59 |
| 2,336,423 | 12/1943 | Rieser | 249/59 |
| 2,363,808 | 11/1944 | Sayre | 249/59 |
| 2,410,510 | 11/1946 | Lester | 425/547 |
| 2,513,216 | 6/1950 | Sullivan et al. | 249/59 |
| 4,496,302 | 1/1985 | Brown | 249/59 |

Primary Examiner—Willard Hoag
Attorney, Agent, or Firm—Emmanuel J. Lobato; Robert E. Burns

[57] ABSTRACT

Apparatus for molding a thermoplastic tubular product such as a bushing having an internally threaded major diameter portion and an integral truncated minor diameter portion. A mold provided with a mold shell which jointly with a two-part mold core defines a mold cavity having a shape complementary to the shape of the molded bushing. The molded bushing has an internal undercut in the form of a thread in the major diameter portion thereof. The mold core is made as a core pin and an externally threaded sleeve of greater diameter than the core pin circumferentially of a portion of the core pin. Provision is made for moving the mold elements relatively to define the mold cavity and to effectively release the core by axial compression of the molded product while exposed on the mold core to cause it to swell radially outwardly and release the externally threaded core which forms the internal thread on the molded bushing.

8 Claims, 3 Drawing Sheets

DEVICE FOR FORMING OF THERMOPLASTIC PRODUCTS EQUIPPED WITH UNDERCUTS

BACKGROUND OF THE INVENTION

It is known that for forming bodies equipped with undercuts it is necessary to use high-cost molds made of several parts which can be taken apart.

In the case of thin-walled tubular bodies, the mold has been simplified by exploiting the high degree of elasticity of thermoplastic products at temperatures between their forming temperature and ambient temperature. This process may be used when the undercut has dimensions comparable to the thickness of the wall of the tubular body in question.

If, on the other hand, the undercuts have a smaller depth than the wall, that is to say if the wall of the hollow body is relatively thicker than the diameter, shaking out requires again expensive composite molds. This requirement is further aggravated for those manufactured products having multiple undercuts, such as those constituted by the grooves of a thread.

In the latter case, it is common practice to unscrew that part of the mold which is in contact with the thread in question, by means of a suitable number of turns.

This turning of a part of the mold entails long times and therefore slows down the productivity of the machine.

BRIEF SUMMARY OF THE INVENTION

According to the invention, the mold has a pin which defines the inside surface of the annular body to be formed and an outer shell which defines the outside surface of the same body.

The above pin provides means of cooling located in the vicinity of the area without undercuts and means of heating in the vicinity of the area of the body to be formed which does have undercuts.

The two bases of the body to be formed are defined on one side by a feeder bush, so called since it contains the molten material feeder channel, and on the other side a holed shakeout plate, so called since it is used to pull the newly formed body out from the above pin. The thrust plate is located in the vicinity of the part of the formed body equipped with undercuts and which, due to the presence of the means of heating still has a high degree of elasticity (that is to say a low Young modulus).

Thus the thrust plate causes a radial swelling of the part fitted with undercuts, allowing it to be freed from the underlying pin.

DETAILED DESCRIPTION OF A PREFERRED EMBODIMENT

Figure 1:
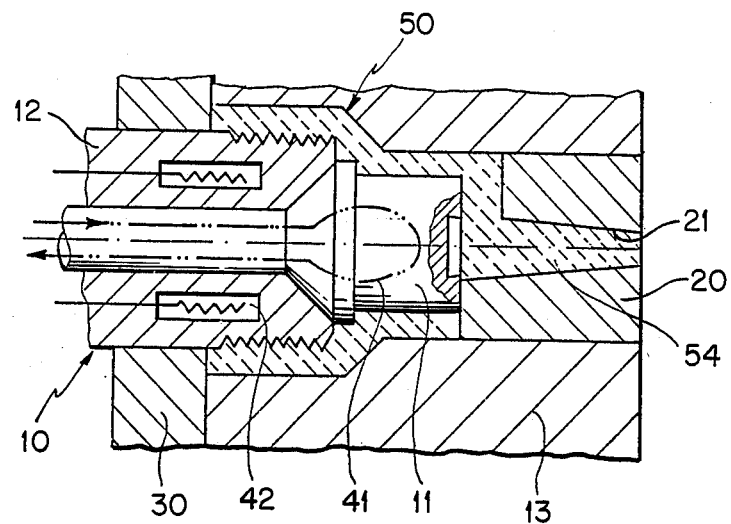
FIGS. 1 to 6 show the various phases of forming and shaking out of the annular piece provided with undercuts, using the device according to the invention.

With particular reference to the above figures, (50) indicates a bushing in thermoplastic material, having a substantially tubular shape and a substantially uniform thickness, this thickness being distributed over two different diameters.

The part of the threaded bushing having the greater diameter (51) is threaded internally (52). It is precisely the ribs of this thread which constitute the undercuts of the piece to be formed.

The part of threaded bushing with the smaller diameter (53) is, in the case illustrated at least, smooth, and is connected to the first part (51) by truncated conical surfaces or suitable steps.

The device according to the invention has a pin 10 defining the internal surface of the threaded bushing to be formed.

This pin 10 is made up of two coaxial elements. The first of these elements, indicated with number 11, defines the internal surface of the smooth surfaced length 53 of the threaded bushing to be formed.

The second of said coaxial elements of the pin 10, indicated as number 12, consists of a sleeve defining the internal threaded surface 52 of the first length of the threaded bushing to be formed.

The first element 11 slides axially in respect of the second element 12, thanks to an extension indicated as 43, and is suitably connected to a means of actuation, not shown in the figure.

The device also has a thrust plate 30, which slides on the sleeve 12, and which serves to define the larger base of the threaded bushing to be formed.

The smaller base of the threaded bushing to be formed is instead defined by a cylindrical piece 20, passed through by a pouring hole 21 and therefore hereinafter called the feeder bushing.

Finally, the outer surface of the threaded bushing to be formed is defined by a shell 13 made in a single piece and equipped with axial movement. This outer shell may also be equipped with radial movement, in which case it must be made of at least two parts.

As shown in detail in FIG. 1 only, the internal element 11 of the pin 10 is fitted with a cooling circuit 41 which involves the smooth, smaller diameter part, 53, of the threaded bushing 50.

On the contrary, the external element 12 of the pin 10 is equipped with a heating circuit 42 which involves, that is to say acts on, the threaded part of the bushing 50, that is to say on part 51 equipped with undercuts.

The working is as follows:

During the forming phase, the various parts of the device are in the reciprocal positions illustrated in FIG. 1, in which the threaded bushing to be formed has already been obtained, together with its sprue or riser 54, which occupies the pouring hole 21 made in the feeder bushing 20.

Immediately after forming, that is to say immediately after the molten material has finished filling the mold, cooling of this material begins. This cooling will not be uniform, in view of the presence of the means of heating 42 and the means of cooling 41. po As a consequence of this, the part 51 equipped with undercuts of the threaded bushing 50, will have a temperature higher than that of the part 53 of the threaded bushing.

It is well known that the Young modulus of thermoplastic materials is inversely proportional to temperature, which allows greater elastic deformations at higher temperatures for the same unit stress.

The first phase of the shakeout process calls for rotation of the feeder bushing 20, which causes the riser 54 to be cut off at its root.

Figure 2:
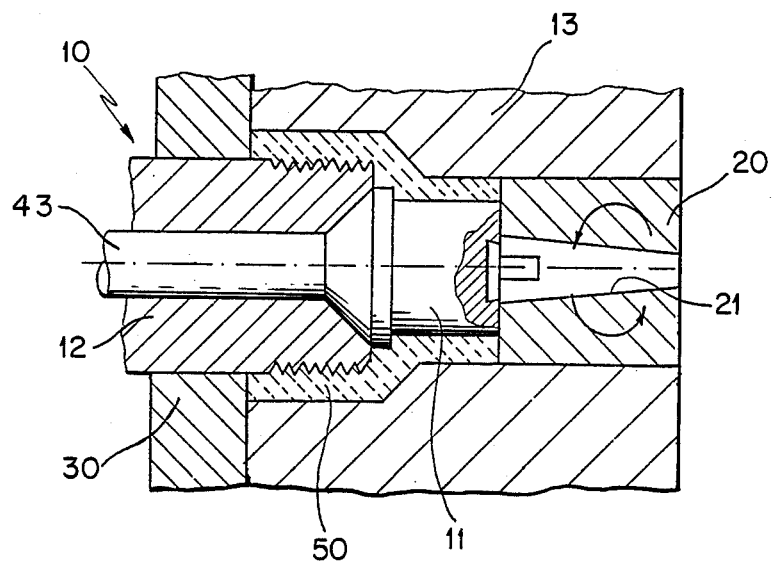

This situation is illustrated in FIG. 2.

Once the riser 54 has been detached, both the forming bushing 20 and the shell 13 are moved axially backwards, so as to free the outer surface of the threaded bushing 50.

Figure 3:
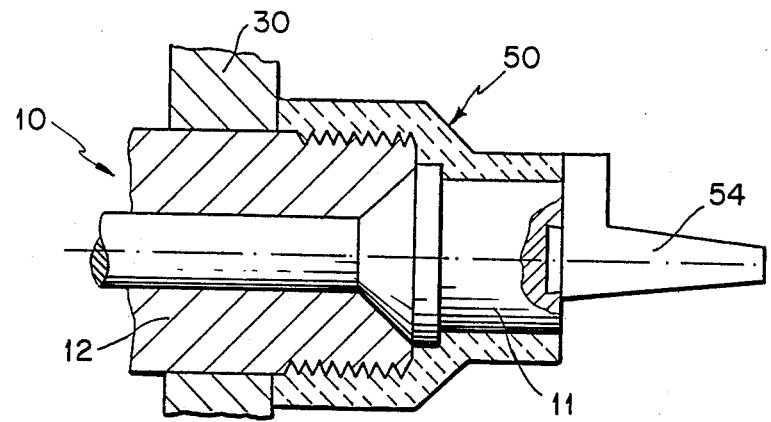

This situation is illustrated in FIG. 3.

In this position, the part 53 of the threaded bushing 50 having the smaller diameter and having a smooth inner surface adheres to the outer surface of the element 11 of the pin 10. This by effect of the cooling caused by the circuit 41.

On the contrary, the inner threaded surface of the part 51 of the threaded bushing hugs the underlying surface of the element 12 of the pin 10 less tightly, due to the effect of the heating circuit 42 mentioned above. At this point, the shakeout phase of the threaded bushing 50 from the pin 10 starts. To this end, the element 11 of the pin 10 and the shakeout plate 30 move forward parallel to the element 11 delayed in respect of the element 30, while the element 12 of the pin 10 remains still.

The part 51 equipped with undercuts of the threaded bushing 50 is forced to swell radially by effect of the compression undergone: its narrowest part adheres to the element 11 by effect of said cooling, so that it is able to develop a slight force of friction.

Furthermore, the radial swelling of the part 51 is favoured by its higher temperature.

In any case, these combined effects have as a consequence the detachment of the inner threaded surface of the bushing 50 from the outer surface of the element 12 of the pin 10.

Figure 4:
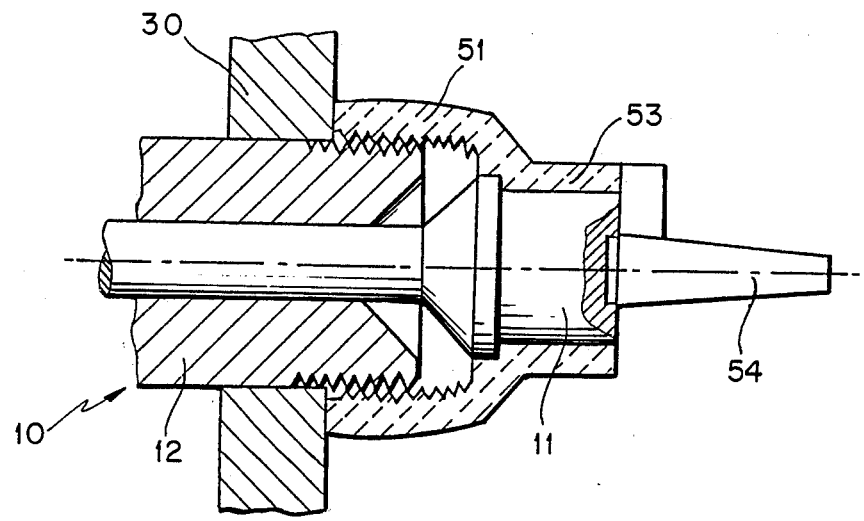

This situation is well illustrated in FIG. 4.

Figure 5:
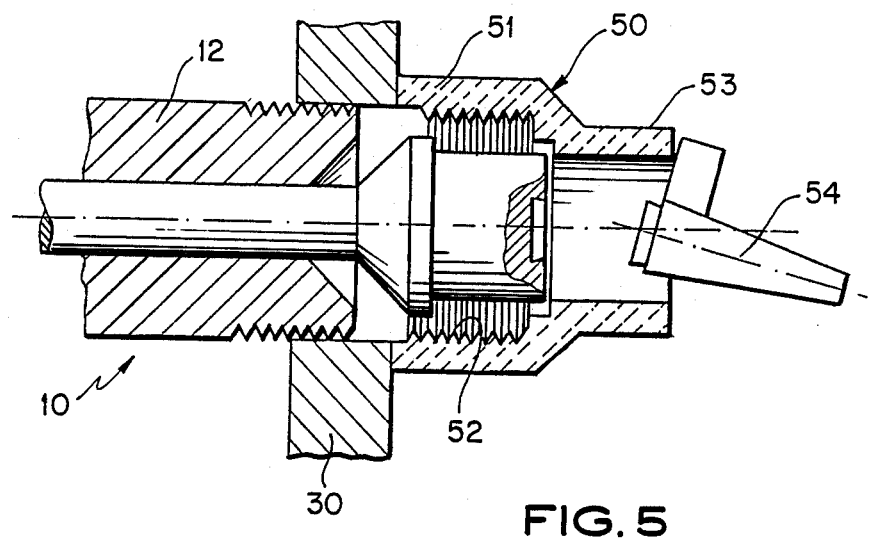
Figure 6:
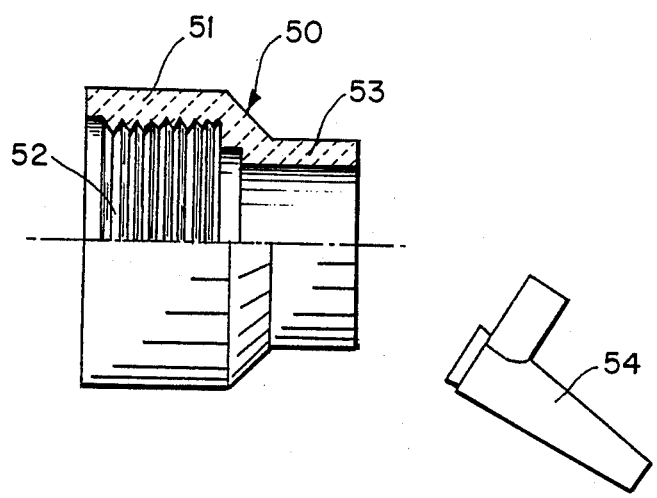

At this point the axial movement of the element 11 of the pin 10 is stopped while the axial movement of the shakeout plate 30 continues, so that, as shown in FIG. 5, the newly formed piece is extracted from the pin 19 and subsequently falls into a basket not shown in the figure (FIG. 6). In the example just illustrated, the piece to be formed equipped with undercuts consisted of an internally threaded bushing, and in which, as is usually the case, the internally threaded part had a greater diameter than the internally smooth part.

In actual fact, these characteristics are not essential, since the undercuts may be distributed in a different manner.

In particular the part 11 of the pin 10 could be controlled and sustained on the side opposite to the position occupied by the shakeout plate, so as to allow precisely a different distribution of the parts equipped with undercuts, and in particular with internal threads.

What we claim is:

1. Apparatus for molding a thermoplastic bushing comprising, a mold shell open at opposite ends, a mold core made of two parts comprising a core pin having a forward major diameter portion and a rear minor diameter portion, said core comprising an externally threaded core sleeve disposed in use circumferentially of the minor diameter portion of the core pin slidable axially relatively thereto and having an outer diameter greater than the diameter of the major diameter portion of the core pin, said mold core being disposed in use internally of the mold shell jointly defining therewith a mold cavity corresponding in shape to a shape of the thermoplastic bushing being molded and having a thermoplastic major diameter portion internally threaded and and integral thermoplastic truncated portion of lesser diameter, a feeder bushing defining one end of the mold cavity and having an open feeder opening eccentrically in communication with the cavity for delivery of thermoplastic material into the mold cavity, a plate through which said core sleeve extends disposed closing an opposite end of the mold cavity, said feeder bushing being rotatable for shearing off a thermoplastic sprue after the thermoplastic bushing has been molded and movable axially out of the mold shell, the mold sleeve being axially movable relative to the molded bushing to expose it on the mold core, said plate being movable toward the molded bushing when exposed to apply compression to the molded bushing while in a plastic state to cause the major diameter portion of the molded bushing to swell outwardly and release the externally threaded core sleeve for permitting the core to be moved axially partially out of the molded bushing thereby to release the molded bushing from the apparatus mold for removal from the core in a completely molded state.

2. Apparatus for molding a thermoplastic bushing according to claim 1, in which said core sleeve comprises heating means for heating the molded bushing on the mold core.

3. Apparatus for molding a thermoplastic bushing according to claim 1, in which said core pin comprises a cooling circuit for cooling said major diameter portion thereof for cooling the molded bushing on the core.

4. Apparatus for molding a thermoplastic bushing according to claim 1, in which said feeder bushing defines during molding of the molded bushing a base of the truncated portion of the molded bushing.

5. Apparatus for molding a thermoplastic bushing according to claim 1, in which said plate defines during molding of the molded bushing a base of the major diameter portion of the molded bushing.

6. Apparatus for molding a thermoplastic product comprising a mold having a mold shell open at opposite ends, a mold core made of two parts comprising a core pin having a forward major diameter portion and a diameter portion, said core comprising a core sleeve and movable axially out of the mold shell, disposed in use circumferentially of the minor diameter portion of the core pin slidable axially relative thereto and having an outer diameter greater than the diameter of the major diameter portion of the core pin, said mold core being disposed in use internally of the mold shell jointly defining therewith a mold cavity complementary in shape to a shape of the thermoplastic product being molded and having a thermoplastic major diameter portion having an internal undercut and and integral thermoplastic truncated portion of lesser diameter, a feeder bushing defining one end of the mold cavity and having an open feeder opening eccentrically in communication with the cavity for delivery of thermoplastic material into the mold cavity, a plate through which said core sleeve extends disposed closing an opposite end of the mold cavity, said feeder bushing being rotatable for shearing off a thermoplastic feeder sprue after the thermoplastic product has been molded and movable axially out of the mold shell, the mold sleeve being axially movable relative to the molded product to expose it on the mold core, said plate being movable toward the molded product when exposed to apply compression to the molded product while in a plastic state on the core to cause the major diameter portion of the molded product to swell outwardly and release the core sleeve for permitting the core to be moved axially partially out of the molded product thereby to release the molded product with an internal undercut from the apparatus mold for removal from the core in a completely molded state.

7. Apparatus for molding a thermoplastic bushing according to claim 6, in which said internal undercut on the molded bushing comprises an internal thread.

8. Apparatus for molding a thermoplastic internally threaded tubular product comprising, a mold having a mold shell open at opposite ends, a mold core made of two parts comprising a core pin having a forward portion and a rear portion, said core comprising an externally threaded core sleeve disposed in use circumferentially of the rear portion of the core pin and slidable axially relative thereto, said mold core being disposed in use internally of the mold shell jointly defining therewith a mold cavity complementary in shape to a shape of the thermoplastic tubular product being molded, a feeder bushing defining one end of the mold cavity and having a feeder opening eccentrically in communication with the cavity for delivery of thermoplastic material into the mold cavity, a plate through which said core sleeve extends disposed closing an opposite end of the mold cavity, said feeder bushing being rotatable for shearing off a thermoplastic feeder sprue after the thermoplastic product has been molded and movable axially out of the mold shell, the mold sleeve being axially movable relative to the molded product to expose it on the mold core, said plate being movable toward the molded product when exposed to apply compression to the molded product while in a plastic state to cause the molded product to swell radially outwardly and release the externally threaded core sleeve for permitting the core to be moved axially partially out of the molded tubular product thereby to release the molded tubular product from the apparatus mold for removal from the core in a completely molded state.

* * * * *